United States Patent
Uekusa et al.

(10) Patent No.: US 10,116,865 B2
(45) Date of Patent: Oct. 30, 2018

(54) IMAGE PROCESSING APPARATUS AND IMAGE PROCESSING METHOD FOR CALCULATING MOTION VECTOR BETWEEN IMAGES WITH DIFFERENT IN-FOCUS POSITIONS

(71) Applicant: CANON KABUSHIKI KAISHA, Tokyo (JP)

(72) Inventors: Tomotaka Uekusa, Yokohama (JP); Soichiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 15/142,140

(22) Filed: Apr. 29, 2016

(65) Prior Publication Data

US 2017/0069104 A1 Mar. 9, 2017

(30) Foreign Application Priority Data

Sep. 4, 2015 (JP) ................ 2015-174990

(51) Int. Cl.

| G06K 9/00 | (2006.01) |
|---|---|
| H04N 5/232 | (2006.01) |
| G06T 7/55 | (2017.01) |
| H04N 19/513 | (2014.01) |
| G06T 7/20 | (2017.01) |
| G06T 7/50 | (2017.01) |
| H04N 19/139 | (2014.11) |
| H04N 19/51 | (2014.01) |

(52) U.S. Cl.
CPC .......... *H04N 5/23248* (2013.01); *G06T 7/20* (2013.01); *G06T 7/50* (2017.01); *G06T 7/55* (2017.01); *H04N 19/139* (2014.11); *H04N 19/51* (2014.11); *H04N 19/521* (2014.11)

(58) Field of Classification Search
CPC .. G06T 7/20; G06T 7/223; G06T 7/50; G06T 7/55; H04N 19/139; H04N 19/51; H04N 19/513; H04N 19/521; H04N 19/527
USPC ................ 382/100, 103, 106–108, 236, 325; 396/153, 322
See application file for complete search history.

(56) References Cited

U.S. PATENT DOCUMENTS

| 7,623,153 B2* | 11/2009 | Hatanaka ........... H04N 5/23248 348/208.12 |
|---|---|---|
| 8,035,725 B2* | 10/2011 | Chen ........................ G06T 5/50 348/218.1 |
| 8,369,571 B2* | 2/2013 | Ishikawa ................. G06T 7/246 382/103 |
| 9,256,948 B1* | 2/2016 | Seitz ..................... G06T 7/0069 |
| 9,787,899 B1* | 10/2017 | Hinkel ............... H04N 5/23254 |

(Continued)

FOREIGN PATENT DOCUMENTS

JP 2003-224854 A 8/2003

*Primary Examiner* — Eric Rush
(74) *Attorney, Agent, or Firm* — Cowan, Liebowitz & Latman, P.C.

(57) ABSTRACT

A disclosed image processing apparatus detects a motion vector between a first image and a second image based on the correlation between the first image and the second image. When the degree of reliability of the detected motion vector is determined based on an evaluation value regarding the correlation, a difference in amount of bokeh between the first image and the second image is considered to improve accuracy of the degree of reliability of the motion vector.

10 Claims, 7 Drawing Sheets

(56) References Cited

U.S. PATENT DOCUMENTS

| | | | | |
|---|---|---|---|---|
| 2009/0153680 A1* | 6/2009 | Shibata | .............. | H04N 5/23248 348/208.6 |
| 2009/0208102 A1* | 8/2009 | Watanabe | .................. | G06T 7/30 382/168 |
| 2009/0252374 A1* | 10/2009 | Ishikawa | .................. | G06T 7/246 382/103 |
| 2010/0002005 A1* | 1/2010 | Nagaishi | .............. | G09G 3/2022 382/197 |
| 2014/0009634 A1* | 1/2014 | Hiwada | .................. | H04N 5/225 348/222.1 |
| 2014/0152886 A1* | 6/2014 | Morgan-Mar | ..... | H04N 5/23212 348/349 |
| 2014/0247981 A1* | 9/2014 | Kusaka | ................ | H04N 5/3572 382/165 |

* cited by examiner

IMAGE PROCESSING APPARATUS AND IMAGE PROCESSING METHOD FOR CALCULATING MOTION VECTOR BETWEEN IMAGES WITH DIFFERENT IN-FOCUS POSITIONS

BACKGROUND OF THE INVENTION

Field of the Invention

The present invention relates to an image processing apparatus and an image processing method, and particularly relates to a motion vector detection technique.

Description of the Related Art

As a method for detecting a motion vector between images, a template matching method is known. The template matching method is a method for setting a partial area of one image as a template image, searching for a partial area in another image whose correlation with the template image is largest, and detecting the difference between the positions of the partial areas as a motion vector (Japanese Patent Laid-Open No. 2003-224854). In some cases, the search range is limited, or a plurality of template images are used.

In Japanese Patent Laid-Open No. 2003-224854, the correlation between image areas is evaluated based on the magnitude of an SAD (Sum of Absolute Differences), and an area whose SAD with the template image is smallest is searched for. In addition, the degree of reliability of the detected motion vector is determined based on the magnitude relationship between the SAD and a plurality of predetermined threshold values.

However, in the case where there is a difference in the degree of bokeh between images as in the case where in-focus distances are different or the in-focus position varies between images, a correlation evaluation value that is based on the difference between pixel values such as an SAD is larger as a whole than in the case where there is no difference in the degree of bokeh. Therefore, if the degree of reliability of the motion vector is evaluated based on the magnitude relationship between the correlation evaluation value and fixed threshold values, there is a risk that the degree of reliability is determined to be lower than the actual degree of the reliability.

SUMMARY OF THE INVENTION

The present invention has been made in light of such an issue regarding the conventional technique, and provides an image processing apparatus and an image processing method capable of accurately determining the degree of reliability of a motion vector detected based on the correlation between images.

According to an aspect of the present invention, there is provided an image processing apparatus comprising: a detection unit configured to detect a motion vector between a first image and a second image based on a correlation between the first image and the second image; and a determination unit configured to determine a degree of reliability of the motion vector based on an evaluation value regarding the correlation, wherein the determination unit determines the degree of reliability further based on a difference in amount of bokeh between the first image and the second image.

According to another aspect of the present invention, there is provided an image processing apparatus comprising: a detection unit configured to detect a motion vector between a first image and a second image based on a correlation between the first image and the second image; and a determination unit configured to determine a degree of reliability of the motion vector based on an evaluation value regarding the correlation, wherein the determination unit determines the degree of reliability further based on a difference in in-focus distances of an imaging optical system when the first image and the second image were captured.

According to a further aspect of the present invention, there is provided an image capturing apparatus comprising: an image capturing unit configured to capture a first image and a second image; a detection unit configured to detect a motion vector between the first image and the second image based on a correlation between the first image and the second image; and a determination unit configured to determine a degree of reliability of the motion vector based on an evaluation value regarding the correlation, wherein the determination unit determines the degree of reliability further based on a difference in amount of bokeh between the first image and the second image.

According to another aspect of the present invention, there is provided an image processing method comprising: detecting a motion vector between a first image and a second image based on a correlation between the first image and the second image; and determining a degree of reliability of the motion vector based on an evaluation value regarding the correlation, wherein in the determining, the degree of reliability is determined further based on a difference in amount of bokeh between the first image and the second image.

According to a further aspect of the present invention, there is provided an image processing method comprising: detecting a motion vector between a first image and a second image based on a correlation between the first image and the second image; and determining a degree of reliability of the motion vector based on an evaluation value regarding the correlation, wherein in the determining, the degree of reliability is determined further based on a difference in in-focus distance of an imaging optical system when the first image and the second image were captured.

According to another aspect of the present invention, there is provided a non-transitory computer-readable storage medium that stores a program including instructions for, when executed by one or more processors, causing the one or more processors to function as an image processing apparatus comprising: a detection unit configured to detect a motion vector between a first image and a second image based on a correlation between the first image and the second image; and a determination unit configured to determine a degree of reliability of the motion vector based on an evaluation value regarding the correlation, wherein the determination unit determines the degree of reliability further based on a difference in amount of bokeh between the first image and the second image.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that a digital camera as an example of an image processing apparatus according to the embodiment of the present invention will be described below, but functions related to image capturing and the recording of captured images are not necessary in the present invention. The present invention can be realized in any electronic device that can acquire a plurality of images for motion vector detection, and information on subject distances. Examples of such electronic devices include digital still and video cameras, personal computers, gaming devices, mobile phones, mobile information terminals, car navigation systems, driving recorders, robots and the like, without limitation.

Configuration of Digital Camera

Figure 1:
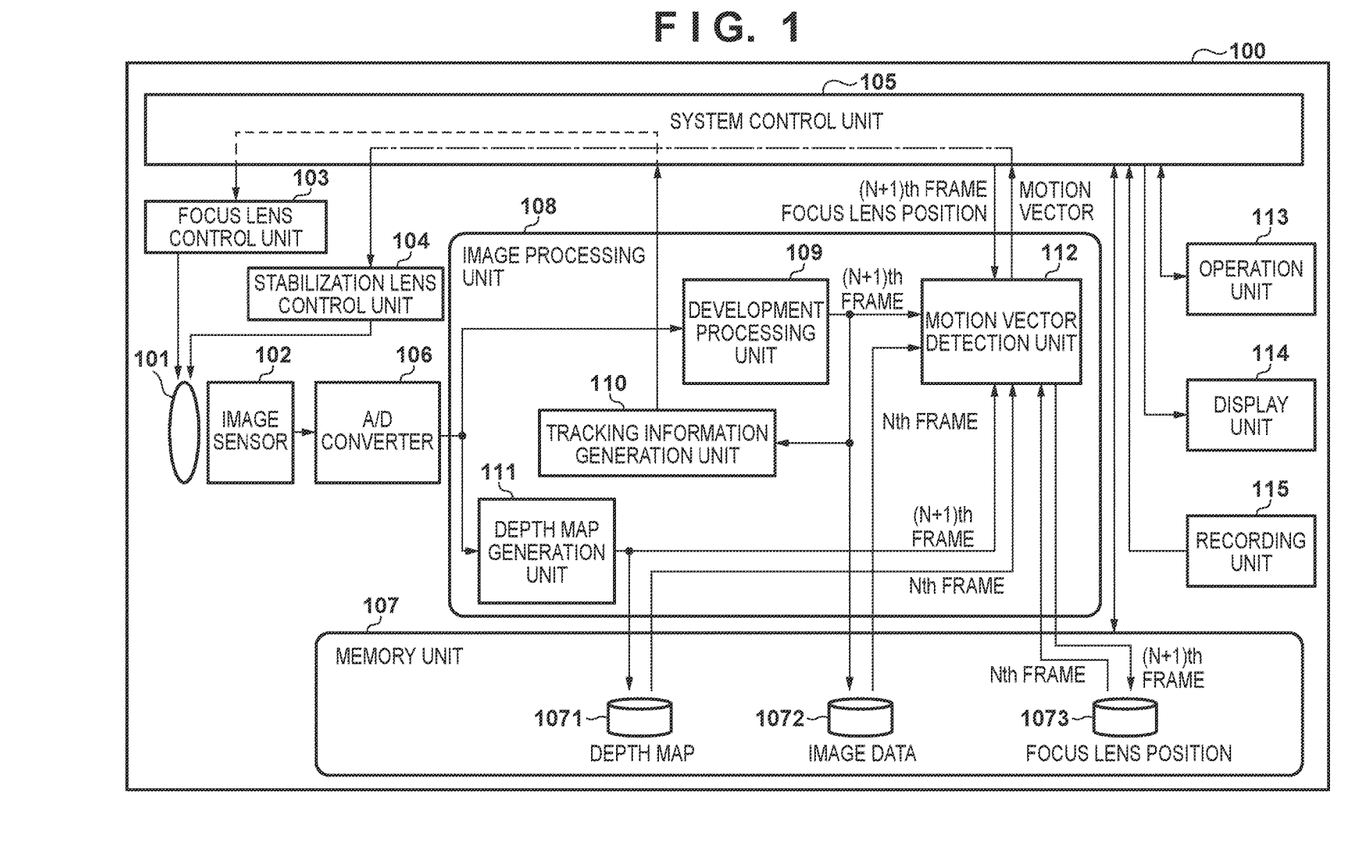
FIG. 1 is a block diagram showing an example of a function configuration of a digital camera as an example of an image processing apparatus according to an embodiment.

FIG. 1 is a block diagram showing an example of the function configuration of a digital camera 100 as an example of the image processing apparatus according to the embodiment of the present invention. The digital camera 100 includes an imaging optical system 101, an image sensor 102, a focus lens control unit 103, a stabilization lens control unit 104, a system control unit 105, an A/D converter 106, a memory unit 107, an image processing unit 108, an operation unit 113, a display unit 114, and a recording unit 115.

The imaging optical system 101 includes a plurality of lenses including a focus lens and a stabilization lens, and a diaphragm, and forms an optical image of a subject on the image capturing plane of the image sensor 102. The focus lens control unit 103 drives the focus lens in accordance with control of the system control unit 105 so as to change the in-focus distance of the imaging optical system. Note that the position of the focus lens may be manually changed by a focus ring rotating operation. The stabilization lens control unit 104 drives the stabilization lens in accordance with control of the system control unit 105, thereby realizing an optical image stabilization function.

The image sensor 102 is a CCD or CMOS image sensor provided with a color filter of a primary color Bayer array, for example. In the image sensor 102, a plurality of pixels are two-dimensionally arranged in a matrix, for example. Each pixel has one or more photodiodes or photoelectric conversion areas, and outputs an analog electrical signal having a voltage that is in accordance with a light receiving amount to the A/D converter 106. The A/D converter 106 converts the analog signals from the image sensor 102 into digital signals, and outputs the digital signals to the image processing unit 108.

The system control unit 105 includes a programmable processor such as a CPU, and controls the operations of constituent elements of the digital camera 100 by executing a control program stored in the memory unit 107, thereby realizing the functions of the digital camera 100. The system control unit 105 also performs control of the input and output of data and signals between the constituent elements of the digital camera 100.

The memory unit 107 includes a non-volatile area and a volatile area. The non-volatile area stores basic software, programs used for the system control unit 105 and the image processing unit 108 to perform various types of control and signal processing, which will be described later, and various types of data used along with execution of the programs. The volatile area is used as a work area for loading a program and storing temporary data. In this embodiment, the data temporarily stored in the volatile area includes a depth map 1071, image data 1072 after development processing, a focus lens position 1073 and the like, without limitation. Also, the focus lens position data is an example of information indicating an in-focus distance during shooting, and may be expressed in another format such as a numeric value indicating a specific distance. Note that the non-volatile area and the volatile area may be individually realized by separate memory elements.

The image processing unit 108 includes a development processing unit 109, a tracking information generation unit 110, a depth map generation unit 111, and a motion vector detection unit 112. At least some of the units of the image processing unit 108 may be realized by a hardware circuit such as a programmable logic array or ASIC, or may be realized by the system control unit 105 executing a program.

The image processing unit 108 performs various types of image processing on the digital signal (image data) supplied from the A/D converter 106 and the image data stored in the volatile area of the memory unit 107, in accordance with control of the system control unit 105. Gamma correction processing, white balance adjustment processing, processing for conversion between RGB format and YUV format, color interpolation processing (demosaic processing) and the like are performed in the development processing unit 109. The development processing unit 109 outputs the processed image data to the motion vector detection unit 112 and the memory unit 107. Note that the development processing unit 109 may reduce the number of the pixels in the image data before applying image processing or immediately before outputting the processed image data in order to reduce the processing load or obtain a resolution suitable for the application. In addition, the development processing unit 109 may cause image data to be output to the memory unit 107 and image data to be output to the motion vector detection unit 112 to have different resolutions.

The tracking information generation unit 110 searches for, within a plurality of images along a time series such as moving image frames, the position of a subject area such as an area specified through the operation unit 113 or an area detected by performing person detection processing such as face detection processing, for example, and generates position information regarding the detected subject area. The system control unit 105 sets a focus detection area based on the subject area position information and performs automatic focus detection, thereby realizing a subject tracking function for maintaining a specific subject in a focused state.

The motion vector detection unit 112 detects a motion vector between images having different shooting times such as moving image frames, and outputs motion vector information (for example, image coordinates of a start point and an end point) to the system control unit 105. The system control unit 105 controls the stabilization lens control unit 104 based on the motion vector information, thereby controlling the stabilization lens and realizing the image stabilization function. The configuration and operations of the motion vector detection unit 112 will be described later in detail.

In this embodiment, the image processing unit 108 also includes the depth map generation unit 111 for generating a depth map indicating information on a distance to the subject based on the image data. The depth map can be generated based on any known technique. For example, in the case where the pixels of the image sensor 102 have a pupil division function, and a pair of parallax images can be obtained, a subject distance can be obtained for each pixel based on information such as the parallax at which the correlation between the parallax images is the highest and the pixel pitch.

Alternatively, the subject distance for each pixel can also be obtained by detecting, based on a contrast evaluation value or the like, an in-focus area in images sequentially captured while changing the position of the focus lens. Furthermore, the depth map may be generated by a TOF (Time of Flight) method, a pattern irradiation method or the like using a light source for illuminating the subject. Note that the depth map may be generated by a method that is not based on the image data obtained by the image sensor 102. In this embodiment, the depth map is generated in the format of a distance image in which the subject distance at a pixel position is indicated by the luminance of the pixel, but another format may be used.

Besides the processing described here, the image processing unit 108 can perform various types of image processing such as image data encoding and decoding processing, image processing for adding visual effects, and image synthesizing processing.

The operation unit 113 is a group of input devices such as various switches, dials, buttons, and a touch panel for a user to input operation instructions such as instructions for shooting parameter settings and shooting operations to the digital camera 100. Such input from the operation unit 113 is detected by the system control unit 105.

The display unit 114 is a liquid crystal display (LCD) or the like, and displays various images transferred from the system control unit 105, information on the digital camera 100, and the like. Images that are displayed include live view images, images read out from the recording unit 115, images related to a GUI such as a setting screen, and the like.

The recording unit 115 performs reading/writing of data from/to a removable recording medium such as a memory card in accordance with control of the system control unit 105.

Motion Vector Detection

Figure 2:
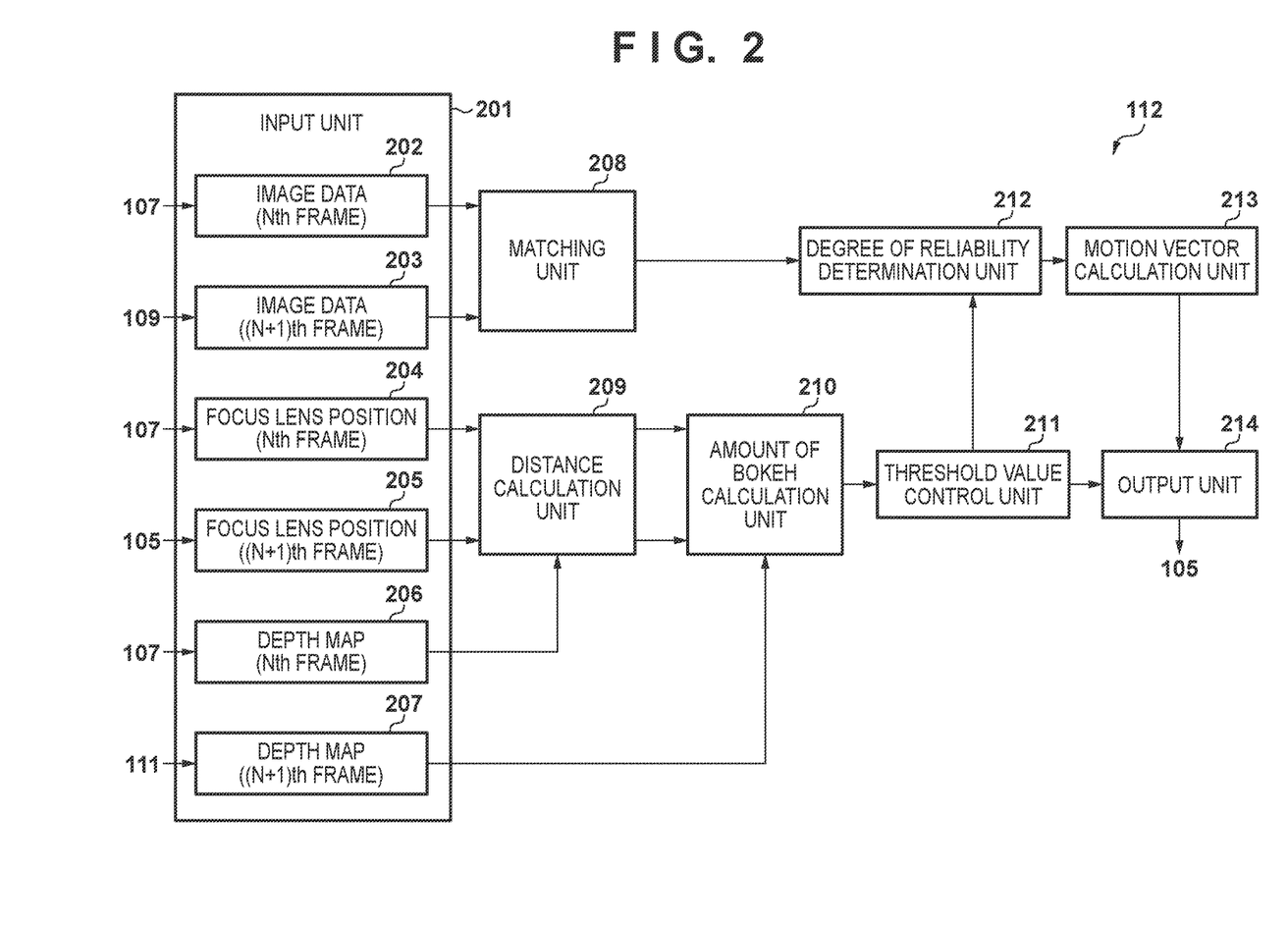
FIG. 2 is a block diagram showing an example of a function configuration of a motion vector detection unit of FIG. 1.

FIG. 2 is a block diagram schematically showing the function configuration of the motion vector detection unit 112. The motion vector detection unit 112 may be realized by the CPU of the system control unit 105 executing software, or may be realized by a hardware circuit such as an ASIC or a programmable logic array. The motion vector detection unit 112 includes an input unit 201, a matching unit 208, a distance calculation unit 209, an amount of bokeh calculation unit 210, a threshold value control unit 211, a degree of reliability determination unit 212, a motion vector calculation unit 213, and an output unit 214.

Assume that in the following description, a plurality of images for detecting a motion vector are, among frame images forming a moving image such as live view images, two consecutive frames, namely, an Nth frame and an (N+1)th frame (N is a natural number). However, the motion vector detection method described below can be carried out not only on consecutive moving image frames, but also on arbitrary images. Also assume that the (N+1)th frame is the most recent frame (current frame) captured by the image sensor 102, and that depth maps, image data and focus lens positions regarding past frames before the Nth frame are stored in the memory unit 107.

The input unit 201 obtains image data 202, a focus lens position 204 during shooting, and a depth map 206 that are related to the Nth frame from the memory unit 107. Regarding the (N−1)th frame, the input unit 201 also obtains image data 203 from the development processing unit 109, obtains a focus lens position 205 from the system control unit 105, and obtains a depth map 207 from the depth map generation unit 111.

The matching unit 208 generates a template image from the image data 202 of the Nth frame, and performs template matching using at least a portion of the image data 203 of the (N+1)th frame as a reference image. Shift amounts in the horizontal and vertical directions (i.e., a motion vector) of the template image at which the correlation between the template image and the reference image is highest is then detected, and the detected shift amounts are output along with the evaluation value of the correlation to the degree of reliability determination unit 212. A detailed description of this will be given later.

The distance calculation unit 209 calculates the distance to the subject in focus (hereinafter, referred to as a subject distance or an in-focus distance) in the image data 202 of the Nth frame and the image data 203 of the (N−1)th frame based on the focus lens position during shooting, and outputs the subject distances to the amount of bokeh calculation unit 210.

The amount of bokeh calculation unit 210 calculates a difference in amount of bokeh between the frame images based on the subject distances calculated by the distance calculation unit 209, the depth map 206 of the Nth frame, and the depth map 207 of the (N−1)th frame, and outputs the difference in amount of bokeh to the threshold value control unit 211.

The threshold value control unit 211 calculates a threshold value for determining a degree of reliability based on the difference in amount of bokeh calculated by the amount of bokeh calculation unit 210, and outputs the threshold value to the degree of reliability determination unit 212.

The degree of reliability determination unit 212 determines the degree of reliability of a matching result (motion vector) based on the correlation evaluation value between the frame images that is output from the matching unit 208 and the threshold value output from the threshold value control unit 211, and outputs the determination result to the motion vector calculation unit 213.

The motion vector calculation unit 213 outputs, to the output unit 214, a motion vector that is based on the matching result for which the degree of the reliability was determined to be highest by the degree of reliability determination unit 212. The output unit 214 outputs data indicating the motion vector (for example, a horizontal direction component and a vertical direction component) to the system control unit 105.

Motion Vector Detection

Figure 3:
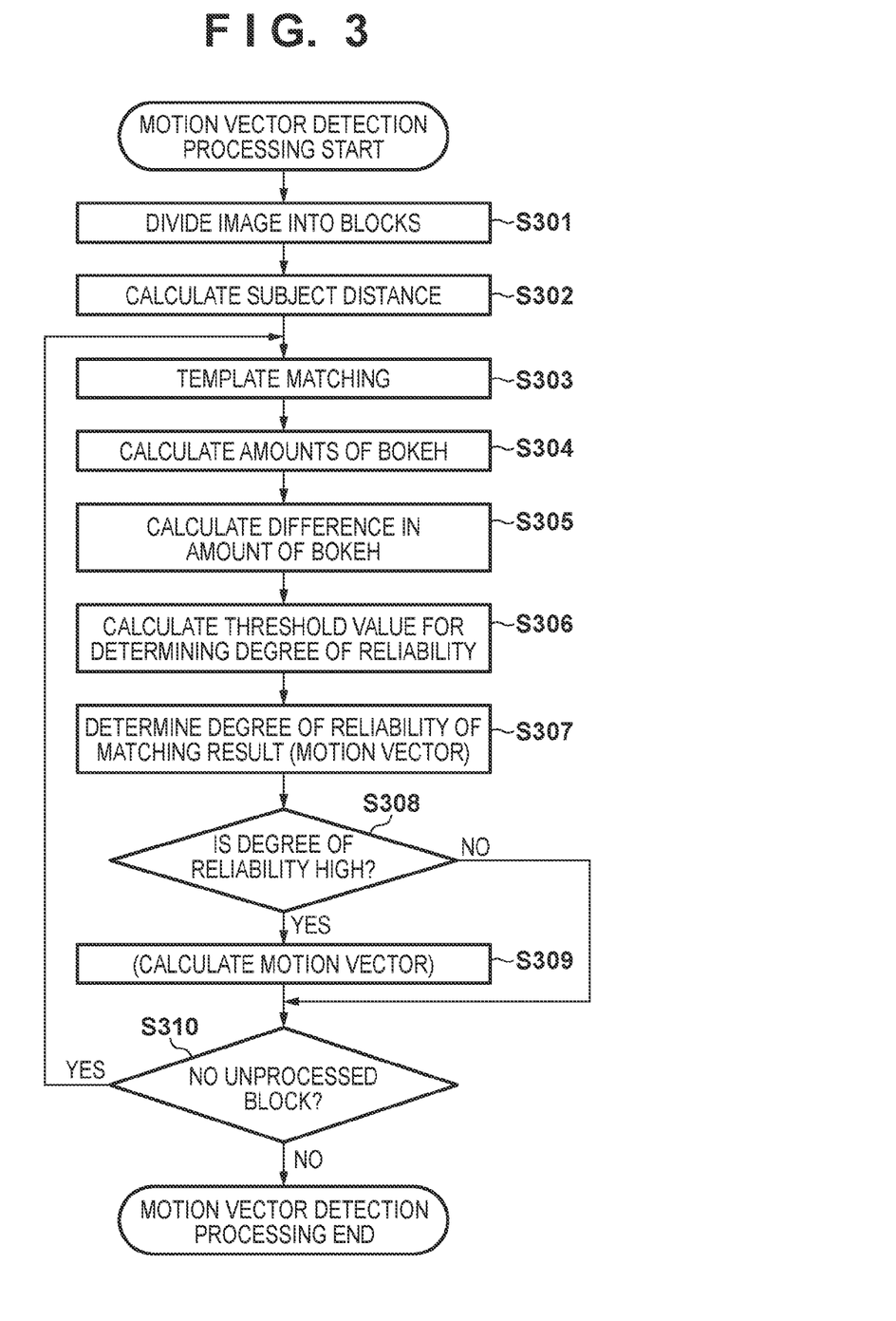
FIG. 3 is a flowchart related to operations of the motion vector detection unit of the embodiment.

Next, the operations of the motion vector detection unit 112 in this embodiment will be described with reference to a flowchart shown in FIG. 3 and the like in addition to FIG. 2.

In step S301, the input unit 201 divides the image data 202 of the Nth frame and the image data 203 of the (N+1)th frame, which were input, into m (m is an integer greater than or equal to 1) blocks, and advances the procedure to step S302.

Figure 4:
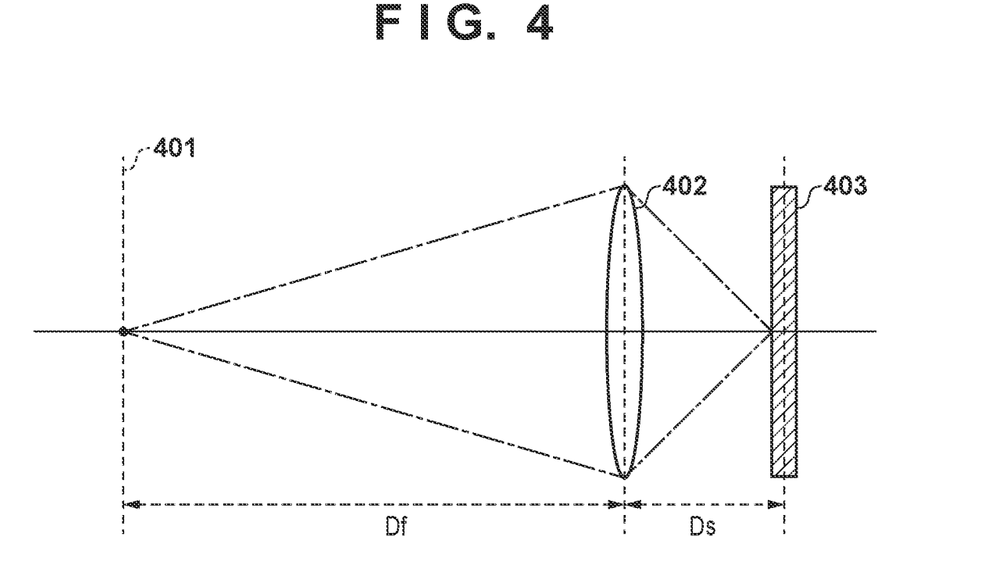
FIG. 4 is a schematic diagram showing a relationship between a subject distance and an image distance.

In step S302, the distance calculation unit 209 calculates the subject distance of the subject in focus for each of the image data 202 of the Nth frame and the image data 203 of the (N+1)th frame, based on the focus lens positions 204 and 205 during shooting. The focus lens position 205 of the (N+1)th frame is obtained by the input unit 201 from the system control unit 105, and the focus lens position 204 of the Nth frame is obtained by the input unit 201 from the memory unit 107. As shown in FIG. 4, letting the distance between a subject 401 in focus and a lens 402 be a subject distance $D_f$, the distance between the lens 402 and an image sensor 403 (image surface) be an image distance $D_s$, and a focal distance be F, the relationship of Expression 1 holds true.

$$\frac{1}{F} = \frac{1}{D_f} + \frac{1}{D_s} \qquad \text{Exp. 1}$$

Note that in the case where there are a plurality of lenses such as the imaging optical system 101, assume that the subject distance and the image distance are distances from the principal point of the lenses. If the focus lens position changes, the image distance $D_s$ changes, and therefore if the image distance $D_s$ that is in accordance with the focus lens position is substituted in Expression 1, the subject distance $D_f$ can be calculated. Note that the focal distance F of the imaging optical system 101 may be acquired through the system control unit 105, or a value stored in the memory unit 107 may be acquired. In addition, if the focal distance F is fixed, the distance calculation unit 209 may have the focal distance F.

Figure 5A:
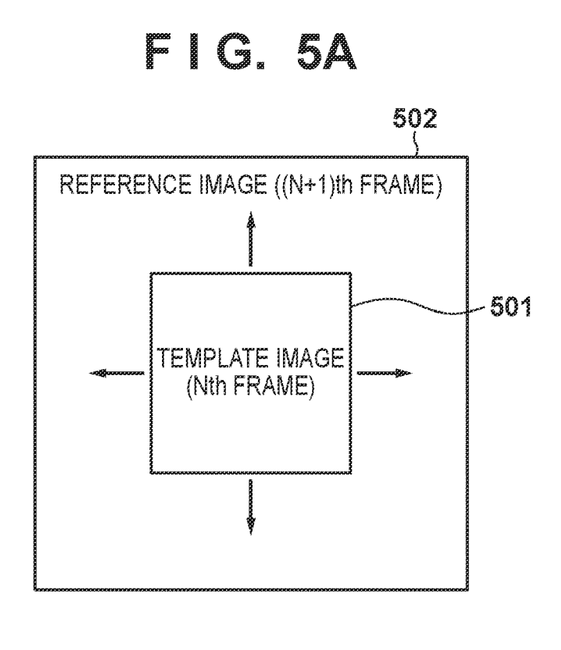
FIGS. 5A and 5B are schematic diagrams related to template matching processing in the embodiment.

In step S303, the matching unit 208 performs template matching processing on each of the blocks divided in step S301. Specifically, the matching unit 208 generates a template image 501 from the blocks of the Nth frame, and performs template matching in a reference image 502, which is a partial area of the (N+1)th frame that is based on the position of the template image 501, as shown in FIG. 5A. The template image 501 (first image) is an area having a preset size smaller than a block, and can be set based on an arbitrarily set position in the block or the position of a feature area such as a face area, for example. On the other hand, the reference image 502 (second image) is an image area whose center coordinate is the same as that of the template image 501, and which has a larger size than the template image 501. The matching unit 208 calculates S_SAD that uses Sum of Absolute Differences (SAD), which is one correlation evaluation value as a template matching evaluation value of the template image 501 and the reference image 502. The calculation expression for the evaluation value S_SAD is expressed as Expression 2.

$$S\_SAD = \Sigma_i \Sigma_j |f(i,j) - g(i,j)| \qquad \text{Exp. 2}$$

In Expression 2, f(i, j) indicates a pixel value at the coordinates (i, j) in the template image 501, and g(i, j) indicates a pixel value in an area that is targeted for correlation value calculation in the reference image 502 and that has the same size as the template image. As indicated by Expression 2, the absolute value of the difference between the pixel values f(i, j) and g(i, j) at the same coordinates in two images is sequentially calculated, and the total of the values is expressed as the evaluation value S_SAD. Therefore, it is seen that the smaller the value of the evaluation value S_SAD is, the higher the correlation between the two images is, that is to say, the higher the similarity is between the texture of the area in the reference image 502 for which the evaluation value was calculated and the texture of the template image 501.

Figure 5B:
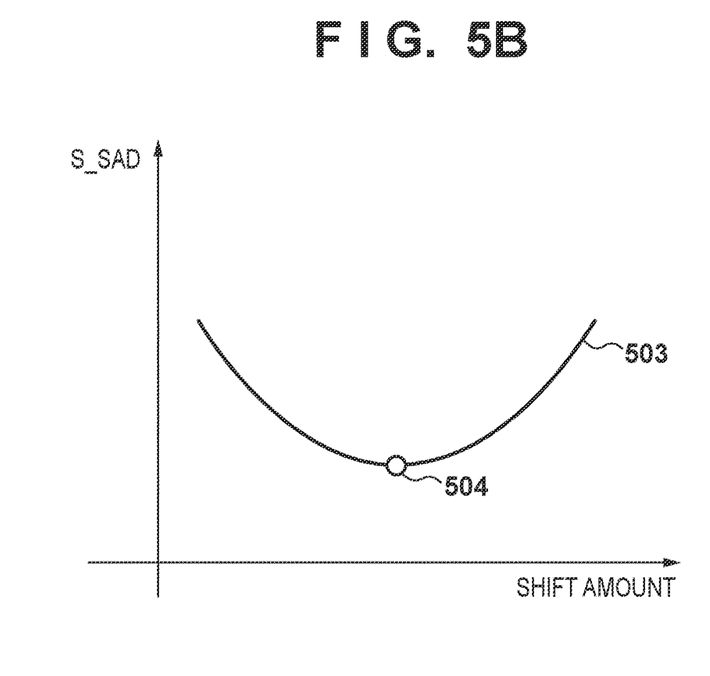

When calculation of the evaluation value S_SAD value by Expression 2 is repeated while shifting the template image 501 one pixel at a time horizontally and vertically in the reference image 502, the evaluation value S_SAD changes in accordance with the shift amount, for example, as indicated by a curved line 503 in FIG. 5B. For example, in the case where the result in FIG. 5B is obtained regarding shift amounts in the horizontal direction, it can be seen that the correlation is highest at the shift amount corresponding to the minimum value 504 of the evaluation value S_SAD. The curved line 503 is obtained for each shift amount in the vertical direction, and the shift amounts in the vertical direction and the horizontal direction at which the evaluation value S_SAD is minimum are detected among all the curved lines 503, thereby making it possible to detect the shift amounts in the horizontal and vertical directions at which the correlation is highest. These shift amounts are the horizontal direction component and the vertical direction component of a motion vector, and therefore detection of the shift amounts in the horizontal and vertical directions at which the correlation is highest is substantially detection of the motion vector. Note that the evaluation value for the matching can be obtained using another calculation method for obtaining a value represents an amount of correlation, such as Sum of Squared Difference (SSD) or Normalized Cross-Correlation (NCC) instead of SAD. The matching unit 208 outputs, to the degree of reliability determination unit 212, the shift amounts at which the correlation is highest, and the evaluation values at that time as the matching result.

In step S304, regarding the Nth frame and the (N+1)th frame, the amount of bokeh calculation unit 210 calculates amounts of bokeh of the template image 501 and the reference image 502 based on the subject distance $D_f$ calculated by the distance calculation unit 209 in step S302 and the depth map obtained by the input unit 201. An amount of bokeh B of the image with a subject distance $D_o$ in an image captured with the focus at the subject distance $D_f$ can be obtained by Expression 3 below.

$$B = I \cdot F \cdot \left| \frac{1}{D_o} - \frac{1}{D_f} \right| \cdot \frac{P}{W} \qquad \text{Exp. 3}$$

In Expression 3, I is the effective diameter (aperture) of the lens, F is the focal distance of the imaging optical system 101, P is the number of horizontal pixels in the image, and W is the horizontal width of the image sensor. In Expression 3, the effective diameter I of the lens, the focal distance F, the number of horizontal pixels P in the image, the horizontal width W of the image sensor, and the subject distance $D_f$ at which focus is placed are values common to the entirety of the captured image. On the other hand, the subject distance $D_o$ for calculating the amount of bokeh is a value that can vary for each pixel.

In this embodiment, the amount of bokeh calculation unit 210 acquires the subject distances corresponding to the pixels of the template image 501 from the depth map of the Nth frame, and calculates the average value of the subject distances as the subject distance $D_o$ corresponding to the template image 501. The amount of bokeh calculation unit 210 then calculates the amount of bokeh of the template image 501 by substituting the average subject distance for the subject distance $D_o$ in Expression 3.

Similarly, the amount of bokeh calculation unit 210 acquires the subject distance corresponding to the pixels of the reference image 502 from the depth map of the (N+1)th frame, and calculates the average value of the subject distances as the subject distance $D_o$ corresponding to the reference image 502. The amount of bokeh calculation unit 210 then calculates the amount of bokeh of the reference image 502 by substituting the average subject distance for the subject distance $D_o$ in Expression 3.

In step S305, the amount of bokeh calculation unit 210 then calculates the difference between the amount of bokeh corresponding to the template image 501 and the amount of bokeh corresponding to the reference image 502 that were calculated in step S304. The difference in amount of bokeh indicates the degree of difference in texture between the two images.

Figure 6:
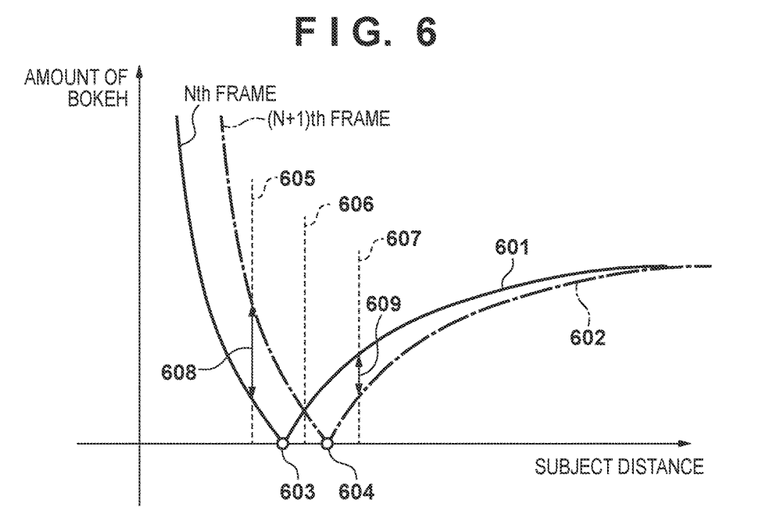
FIG. 6 is a schematic diagram showing an example of a relationship between a subject distance and an amount of bokeh.

FIG. 6 shows an example of a relationship between an amount of bokeh and a subject distance regarding the image data 202 of the Nth frame and the image data 203 of the (N+1)th frame. A solid line 601 indicates the amount of bokeh of the image data 202 of the Nth frame, and a broken line 602 indicates the amount of bokeh of the image data 203 of the (N+1)th frame. The amounts of bokeh of the image data 202 of the Nth frame and the image data 203 of the (N+1)th frame respectively become zero at subject distances 603 and 604 at which focus was placed during shooting, and the further the lens is away from the subject distances 603 and 604, the greater the amounts of bokeh become. In addition, change in the amount of bokeh that is in accordance with the difference between the subject distances 603 and 604 is higher on the close range side, and the amount of bokeh hardly changes on the infinity side when the difference reaches a certain value or more.

Figure 7:
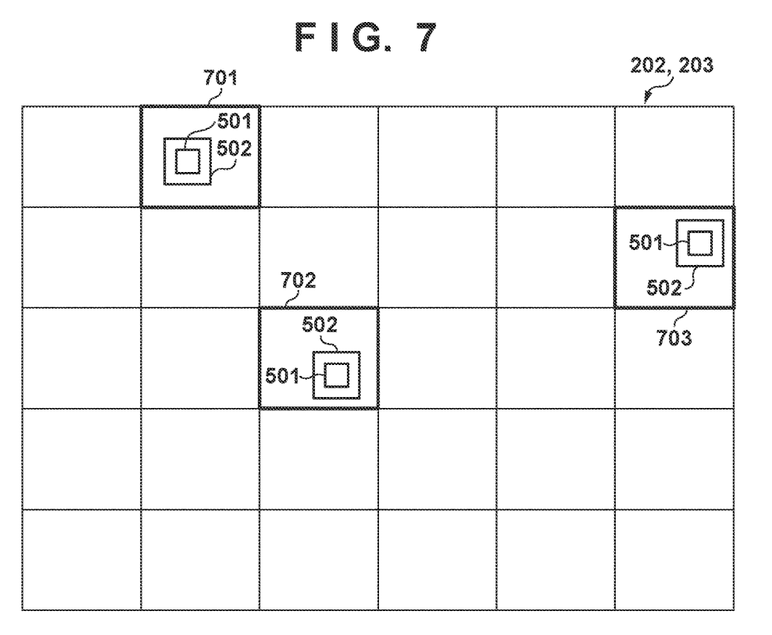
FIG. 7 is a schematic diagram showing an example of blocks in the embodiment.

FIG. 7 is a diagram showing an example of the position relationship between template images, reference images and blocks in the image data 202 of the Nth frame and the image data 203 of the (N+1)th frame. For example, assume that average subject distances corresponding to the template images 501 and the reference images 502 extracted from blocks 701, 702 and 703 as shown in FIG. 7 are respectively subject distances 605, 606 and 607 shown in FIG. 6. At this time, the difference in the amount of bokeh between the template image 501 and the reference image 502 in the block 701 is relatively large as indicated by an arrow 608, there is no difference in the amount of bokeh in the block 702, and in the block 703, the difference is relatively small as indicated by an arrow 609. Note that the description was given here regarding three representative blocks, but calculation of an amount of bokeh and a difference in amount of bokeh is performed on each of the blocks.

Next, in step S306, the threshold value control unit 211 calculates a threshold value Tf for determining the degree of reliability of the matching result in a block to be processed by Expression 4 below using the difference in amount of bokeh calculated in step S305.

$$Tf = Ts + Tc$$

$$Tc = \alpha \times Bd \qquad \text{Exp. 4}$$

In the above expression, Ts is a threshold value (reference threshold value) that is set in advance so as to be applied to the matching result between images between which there is no difference in the amount of bokeh, and Tc is a threshold value control amount for dynamically controlling (correcting) the reference threshold value. In addition, Bd is the difference in amount of bokeh calculated in step S305, the coefficient α is an adjustment parameter for converting the difference in amount of bokeh Bd to have the same scale as the threshold value. The threshold value control unit 211 outputs the calculated threshold value Tf to the degree of reliability determination unit 212.

Figure 8A:
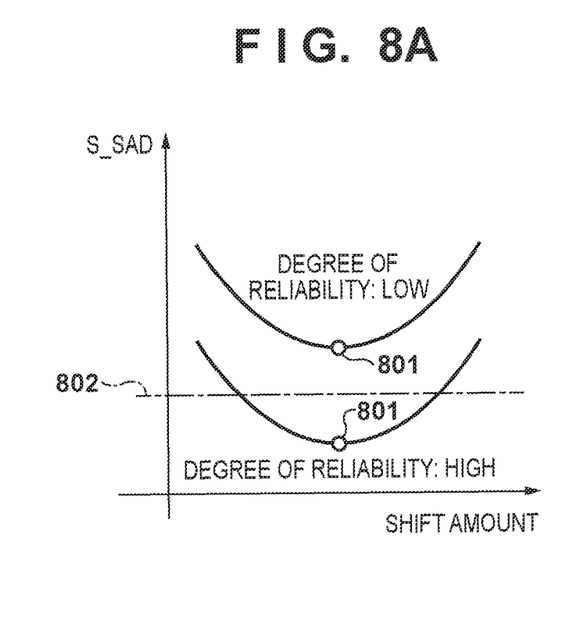
FIGS. 8A and 8B are schematic diagrams related to processing for determining a degree of reliability of a motion vector in the embodiment.

In step S307, the degree of reliability determination unit 212 determines the degree of reliability of the matching result output by the matching unit 208 in step S303, in other words, the degree of reliability of the detected motion vector, based on the threshold value calculated by the threshold value control unit 211 in step S306. The degree of reliability determination unit 212 determines the degree of reliability of the matching result based on the magnitude relationship between the evaluation value obtained as the matching result and the threshold value. Here, S_SAD (a lower value of S_SAD indicates higher correlation) is used as the evaluation value, and therefore, as shown in FIG. 8A, the degree of reliability determination unit 212 determines that the degree of reliability of the matching result is high in the case where an evaluation value 801 is smaller than a reference threshold value 802. Note that in FIGS. 8A and 8B, curved lines indicate the relationship between a shift amount and an evaluation value similarly to FIG. 5B, but this is merely an expression for indicating that the evaluation value output by the matching unit 208 is a minimum value.

As described above, in this embodiment, in a configuration in which the degree of reliability of the matching result (motion vector) is determined in accordance with the magnitude relationship between the evaluation value of the correlation and the threshold value, the determination is made considering the variation in the evaluation value caused by the difference in amount of bokeh between the images that underwent matching. As a specific example of realizing such determination, the threshold value used for determining the degree of reliability is changed in accordance with the difference in amount of bokeh between the images. The difference in amount of bokeh occurs due to the difference in in-focus distance of the imaging optical system during image shooting, and therefore it can be said that the threshold value is changed in accordance with the difference in in-focus distance of the imaging optical system.

Figure 8B:
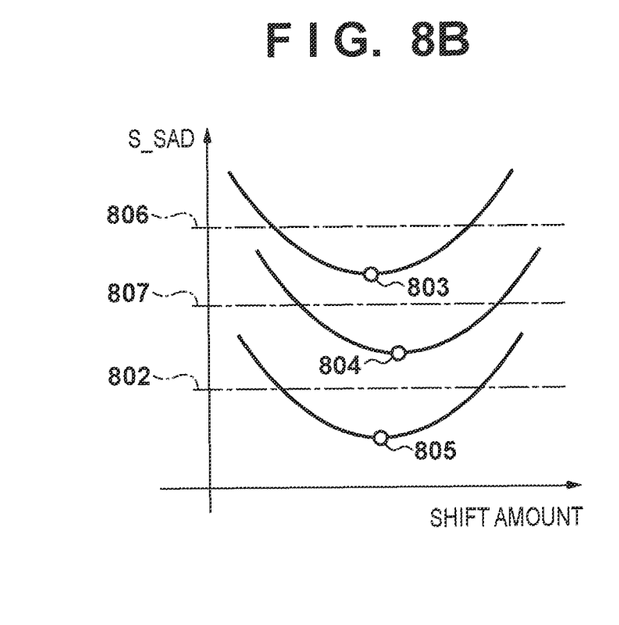

FIG. 8B is a diagram showing an example of threshold value control that is in accordance with the amount of bokeh and a determination result. For example, consider the case in which the differences in amount of bokeh in the blocks 701 to 703 in FIG. 7 are indicated by the subject distances 605 to 607 in FIG. 6. In this case, the higher the difference in amount of bokeh is, the higher the evaluation value is as a whole, and therefore the evaluation values obtained as matching results in the blocks 701 to 703 have a magnitude relationship such as that between evaluation values 803, 805 and 804 in FIG. 8B.

Regarding the block 702 in which there is no difference in amount of bokeh 606, the reference threshold value 802 is used without any change, and it is determined that the degree of reliability is high. On the other hand, the evaluation values 803 and 804 are greater than the reference threshold value 802, and therefore it would be conventionally determined that the degree of the reliability is low. However, if threshold values 806 and 807 greater than the reference threshold value are used in accordance with the difference in amount of bokeh, it is determined that the degrees of reliability of both the evaluation values 803 and 804 are high in the example in FIG. 8B. In this manner, according to this embodiment, it is possible to prevent incorrect determination that a matching result having a high degree of reliability is a matching result having a low degree of reliability low due to the influence of the difference in amount of bokeh between the reference image and the template image. The degree of reliability determination unit 212 outputs, to the motion vector calculation unit 213, data indicating a determination result and the shift amounts supplied along with the evaluation value from the matching unit 208.

Next, in step S308, the motion vector calculation unit 213 checks whether or not the degree of reliability determination unit 212 determined in step S307 that the degree of reliability of the matching result in a target block is high. If it is determined that the degree of reliability of the matching result is high, the procedure is advanced to step S309, and a motion vector for the block is calculated.

In step S309, the motion vector calculation unit 213 calculates a motion vector from the shift amounts at which the highest correlation was obtained in the matching processing. There is no limitation on the method for calculating the motion vector, and for example, in the case where shift amounts in the horizontal direction and the vertical direction obtained from the matching unit 208 are used without any change as data indicating the motion vector, the process of step S309 is not necessary. On the other hand, in the case where a motion vector is indicated by a magnitude and direction (angle), the motion vector calculation unit 213 calculates the magnitude and direction from the shift amounts in the horizontal direction and the vertical direction. The motion vector calculation unit 213 outputs the calculated motion vector from the output unit 214 to the system control unit 105. Alternatively, the calculation results may be accumulated in the memory unit 107 until the processing ends for all the blocks.

On the other hand, in the case where it is found in step S308 that it was not determined that the degree of reliability of the matching result is high (or it was determined that the degree of the reliability is low), the motion vector calculation unit 213 advances the procedure to step S310 without calculating (or outputting) a motion vector. In this manner, a motion vector whose degree of reliability is not high is made invalid.

In step S310, the motion vector calculation unit 213 determines whether or not there is, among the blocks divided in step S301, an unprocessed block that has not undergone the processes of step S303 and later steps. Then, if it is determined that there is an unprocessed block, the motion vector detection unit 112 repeats the processes of step S303 and later steps on the unprocessed block, and if it is determined that there is no unprocessed block, ends motion vector detection processing.

When the motion vector detection processing by the motion vector detection unit 112 ends, the detected motion vectors are output to the system control unit 105. The system control unit 105 calculates a global motion vector indicating the movement of the digital camera 100 based on a histogram of the detected motion vectors, for example. The system control unit 105 then outputs the calculated global motion vector to the stabilization lens control unit 104. The stabilization lens control unit 104 determines a lens shift amount for stabilization from the global motion vector, and performs driving control of the stabilization lens.

As described above, according to this embodiment, the degree of reliability of the pattern matching result is determined considering the difference between the amount of bokeh of the template image and the amount of bokeh of the reference image that were used for the pattern matching. More specifically, the degree of reliability of the pattern matching result is determined considering the influence of the difference in amount of bokeh on the evaluation value indicating the result of pattern matching. Therefore, it is possible to prevent incorrect determination of the degree of reliability caused by the difference in amount of bokeh, and it becomes possible to prevent the deterioration of accuracy of calculating a motion vector between images with different in-focus positions such as moving image frames captured while tracking a moving subject such that the subject is in focus. Therefore, it is possible to improve the accuracy of various functions that use a motion vector such as the stabilization function and the subject tracking function.

Other Embodiments

Note that in the above-described embodiment, a configuration for adjusting the threshold value used for determining the degree of reliability in accordance with the difference in amount of bokeh was described. However, a configuration may be adopted in which the evaluation value S_SAD to be compared with the threshold value is adjusted in accordance with the difference in amount of bokeh, instead of adjusting the threshold value. Specifically, it is sufficient that correction is performed such that the higher the difference in amount of bokeh is, the higher the amount by which the evaluation value is reduced. This also prevents the degree of reliability from being easily determined to be low in the case where the difference in amount of bokeh is large.

In addition, in the above-described embodiment, an example of performing processes of step S306 to step S308 regarding the determination of the degree of reliability regardless of the magnitude of the difference in amount of bokeh calculated in step S305 was described. However, in the case where the difference in amount of bokeh is large to a degree to which it can be determined that there is a high possibility that template matching failed (in the case where the difference in amount of bokeh is greater than or equal to the predetermined value), the processes of step S306 to step S308 may be omitted. A configuration may be adopted in which the processes of steps S304 and S305 regarding calculation of amounts of bokeh and the difference therebetween are performed before the template matching processing of step S303, and in the case where the difference in amount of bokeh is greater than or equal to a predetermined value, subsequent processing including template processing is omitted, and the processing target is changed to the next unprocessed block. In addition, some of the steps shown in time series in the flowchart in FIG. 3 can be performed by parallel processing or performed in a different order.

Furthermore, in the above-described embodiment, a configuration for generating or calculating a depth map and a subject distance was described, but such information does not necessarily need to be generated or calculated. For example, in the case where such information has been generated already and is available during or after recording moving image data, it is sufficient that the generated information is acquired. In addition, generation of the depth map and calculation of the subject distance may be performed by another apparatus. Therefore, in the present invention, configurations for generation of a depth map and calculation of a subject distance are not necessary.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-174990, filed on Sep. 4, 2015, which is hereby incorporated by reference herein in its entirety.

What is claimed is:

1. An electronic device having a function based on a motion vector, comprising:
   one or more processors;
   a memory that stores a program, which is executable by the one or more processors and causes, when executed by the one or more processors, the one or more processors to function as:
   a detection unit configured to detect a plurality of motion vectors between a first image and a second image based on a correlation between the first image and the second image;
   a determination unit configured to determine a degree of reliability for each of the plurality of motion vectors based on a corresponding evaluation value regarding the correlation; and
   a control unit configured to control the function based on a motion vector the degree of reliability of which is evaluated as being high, from among the plurality of motion vectors,
   wherein the determination unit determines the degree of reliability for each of the plurality of motion of vectors further based on a corresponding difference in amount of bokeh between the first image and the second image, and
   wherein the function includes at least one of an image stabilization function and a subject tracking function.

2. The electronic device according to claim 1,
   wherein the determination unit determines the degree of reliability for each of the plurality of motion vectors based on a comparison between the corresponding evaluation value and a threshold value, and
   wherein the determination unit corrects the threshold value or the corresponding evaluation value in accordance with the corresponding difference in amount of bokeh before determining the degree of reliability for each of the plurality of motion vectors.

3. The electronic device according to claim 2,
   wherein the higher the correlation is, the smaller the corresponding evaluation value is, and
   in a case where there is a difference of amount of bokeh between the first image and the second image, the determination unit corrects the threshold value to a greater value than in a case where there is no difference in amount of bokeh between the first image and the second image.

4. The electronic device according to claim 1,
   wherein in a case where the corresponding difference in amount of bokeh is larger than a predetermined threshold value, the determination unit does not determine the degree of reliability for each of the plurality of motion vectors.

5. The electronic device according to claim 1,
   wherein in a case where a difference in amount of bokeh is larger than a predetermined threshold value, the determination unit invalidates a motion vector.

6. An electronic device having a function based on a motion vector, comprising:
   one or more processors;
   a memory that stores a program, which is executable by the one or more processors and causes, when executed by the one or more processors, the one or more processors to function as:
   a detection unit configured to detect a plurality of motion vectors between a first image and a second image based on a correlation between the first image and the second image;
   a determination unit configured to determine a degree of reliability for each of the plurality of motion vectors based on a corresponding evaluation value regarding the correlation; and
   a control unit configured to control the function based on a motion vector the degree of reliability of which is evaluated as being high, from among the plurality of motion vectors,
   wherein the determination unit determines the degree of reliability for each of the plurality of motion vectors further based on a corresponding difference in in-focus distances of an imaging optical system when the first image and the second image were captured, and
   wherein the function includes at least one of an image stabilization function and a subject tracking function.

7. An image capturing apparatus having a function based on a motion vector, comprising:
   one or more processors;
   a memory that stores a program, which is executable by the one or more processors and causes, when executed by the one or more processors, the one or more processors to function as:
   an obtaining unit configured to obtain a first image and a second image from an image sensor;
   a detection unit configured to detect a plurality of motion vectors between the first image and the second image based on a correlation between the first image and the second image;
   a determination unit configured to determine a degree of reliability for each of the plurality of motion vectors based on a corresponding evaluation value regarding the correlation; and a control unit configured to control the function based on a motion vector the degree of reliability of which is evaluated as being high, from among the plurality of motion vectors, wherein the determination unit determines the degree of reliability for each of the plurality of motion vectors further based on a corresponding difference in amount of bokeh between the first image and the second image, and wherein the function includes at least one of an image stabilization function and a subject tracking function.

8. An image processing method comprising:

detecting a plurality of motion vectors between a first image and a second image based on a correlation between the first image and the second image;

determining a degree of reliability for each of the plurality of motion vectors based on a corresponding evaluation value regarding the correlation; and controlling a function based on a motion vector the degree of reliability of which is evaluated as being high, from among the plurality of motion vectors, wherein in the determining, the degree of reliability for each of the plurality of motion vectors is determined further based on a corresponding difference in amount of bokeh between the first image and the second image, and wherein the function includes at least one of an image stabilization function and a subject tracking function.

9. An image processing method comprising:

detecting a plurality of motion vectors between a first image and a second image based on a correlation between the first image and the second image;

determining a degree of reliability for each of the plurality of motion vectors based on a corresponding evaluation value regarding the correlation; and controlling a function based on a motion vector the degree of reliability of which is evaluated as being high, from among the plurality of motion vectors, wherein in the determining, the degree of reliability for each of the plurality of motion vectors is determined further based on a corresponding difference in in-focus distance of an imaging optical system when the first image and the second image were captured, and wherein the function includes at least one of an image stabilization function and a subject tracking function.

10. A non-transitory computer-readable storage medium that stores a program including instructions for, when executed by one or more processors, causing the one or more processors to function as an electronic device having a function based on a motion vector that comprises:

a detection unit configured to detect a plurality of motion vectors between a first image and a second image based on a correlation between the first image and the second image;

a determination unit configured to determine a degree of reliability for each of the plurality of motion vectors based on a corresponding evaluation value regarding the correlation; and a control unit configured to control the function based on a motion vector the degree of reliability of which is evaluated as being high, from among the plurality of motion vectors, wherein the determination unit determines the degree of reliability for each of the plurality of motion vectors further based on a corresponding difference in amount of bokeh between the first image and the second image, and wherein the function includes at least one of an image stabilization function and a subject tracking function.

* * * * *